United States Patent [19]

Johnson

[11] Patent Number: 5,217,288
[45] Date of Patent: Jun. 8, 1993

[54] BEVERAGE BREWER WITH INTERLOCKING COMPONENT PARTS FOR NONTOOL ASSEMBLY/DISASSEMBLY

[75] Inventor: Michael W. Johnson, St. Helens, Oreg.

[73] Assignee: Boyd Coffee Company, Portland, Oreg.

[21] Appl. No.: 662,580

[22] Filed: Feb. 28, 1991

[51] Int. Cl.$^5$ .............................. A47J 31/44
[52] U.S. Cl. .................... 312/257.1; 99/284; 99/300; 99/304
[58] Field of Search ............ 99/284, 295, 300, 302 R, 99/304, 306; 312/228, 257.1

[56] References Cited

U.S. PATENT DOCUMENTS

| | | |
|---|---|---|
| 335,946 | 2/1886 | Milton ............................ 99/304 |
| 3,347,609 | 10/1967 | Mann . |
| 3,856,374 | 12/1974 | Christen . |
| 4,054,085 | 10/1977 | Tarr . |
| 4,174,872 | 11/1979 | Fessler . |
| 4,201,428 | 5/1980 | Johnson . |
| 4,295,693 | 10/1981 | Viklund . |
| 4,307,588 | 12/1981 | Smith et al. . |
| 4,572,596 | 2/1986 | Weir et al. . |
| 4,618,193 | 10/1986 | Cuthbert et al. . |
| 4,829,888 | 5/1989 | Webster et al. . |
| 4,832,421 | 5/1989 | Shoffner . |
| 4,836,626 | 6/1989 | Taylor et al. . |
| 4,854,655 | 8/1989 | Saunders et al. . |
| 4,909,580 | 3/1990 | Mitchell . |
| 4,936,117 | 6/1990 | Kabeya ............................ 312/228 X |

Primary Examiner—Peter R. Brown
Attorney, Agent, or Firm—Kolisch, Hartwell, Dickinson, McCormack & Heuser

[57] ABSTRACT

A beverage brewer is provided which can be assembled without tools from a plurality of component parts and subassemblies. The brewer includes a housing and an internal tank which engages the body of the housing by means of a tank support system. The tank support system attaches the tank to the housing body through relative rotating between the tank and the housing body. A detachable outflow spout on the tank, when attached to the tank, engages a portion of the housing body and prevents rotation of the tank, thereby interlocking the tank to the housing body. A removable access panel on the front of the brewer engages the outflow spout and prevents its detachment from the tank when the panel is in place on the body. The panel thereby locks the tank into the housing, as well as closes the housing. The access panel is locked into place using a key lock. Additional parts of the brewer, including the bottom panel and legs, can be detached without tools only when the panel is removed. All major internal components of the brewer are accessible for disassembly, service and replacement by removing the panel using the key lock.

13 Claims, 4 Drawing Sheets

BEVERAGE BREWER WITH INTERLOCKING COMPONENT PARTS FOR NONTOOL ASSEMBLY/DISASSEMBLY

BACKGROUND AND SUMMARY OF THE INVENTION

The invention relates generally to beverage preparation devices and more particularly to a device for preparing hot beverages such as coffee which can be readily assembled and disassembled from component parts which interlock without tools.

Hot beverage brewers such as coffee brewers are well-known devices which prepare beverages for transfer into dispensers of various shapes, sizes and types. One increasingly popular type of hot beverage dispenser, known as an airpot, is usually a tall, cylindrical insulated container with a pump-type mechanism for dispensing a beverage from a spout in the top. Airpots are often filled using a commercial-grade brewer which is generally a rectangular, upright device that heats water in an internal tank and delivers it downwardly into grounds retaining basket, after which the beverage flows into the airpot positioned below the basket. One purpose of the brewer is to heat and dispense a predetermined quantity of water into the brew basket.

Brewers of lesser or greater complexity are available on the market. Some brewers are designed for interconnection with an external plumbing system to prepare and deliver hot water without the user having to fill a basin. Others, termed "pour-over" brewers, are not interconnected to plumbing and require the user to pour unheated water into a receptacle for subsequent heating. The internals of all brewers are similar, and include a water heating tank or the like and suitable controls for energizing heating coils and shutting off the coils when the correct water temperature has been attained.

While commercial-grade airpot-type beverage brewers vary in complexity, most have a generally rectangular housing which supports the internal tank and encloses the controls. Some type of internal plumbing system delivers cold water to the tank for heating and delivers hot water from the tank for beverage brewing. The various parts of the exterior housing are generally fastened and held together by screws or other threaded fasteners, or by welds or rivets.

Manufacturers of commercial-grade airpot-type beverage brewers usually bring together a number of separate component parts and subassemblies for final assembly. Internal electrical components such as control circuitry for the brewer and external switches and indicator lights arrive at a final assembly station as preassembled components. At final assembly, the various component parts of the brewer are installed in the brewer housing and the housing is assembled around the internal parts. All brewers have some internal parts which are inaccessible without some disassembly of the brewer, including various controls, wiring and plumbing devices and, in most brewers, the main water-heating tank. The assembly sequence for the brewer is usually dictated by the need to gain access to certain locations in the brewer to install otherwise inaccessible parts.

Final assembly of prior art beverage brewers of the type used to fill airpot dispensers has heretofore taken approximately one-half hour or more. In part, the relatively lengthy assembly time results from complicated interconnections between the housing and internal parts. The need to fit together various parts, attach screws or other threaded fasteners, position and interconnect electrical wires and hoses all adds to the assembly time.

Servicing an airpot-type beverage brewer almost always requires some disassembly of the brewer to access parts for replacement or repair. Prior art airpot-type brewers usually require at least as much time to disassemble into separate modular components for servicing as to assemble during manufacture, and usually more time because the service person generally must spend some time determining the proper disassembly sequence. Even the most experienced service person generally spends one-half or more of the "hands on" servicing time in disassembly and assembly of prior art brewers when a relatively inaccessible internal part must be replaced, and usually considerably more than half the time.

It would be advantageous to have a beverage brewer which can be quickly and easily assembled without tools from its main component parts, since this would save manufacturing time. It would also be advantageous to reduce substantially the time required to disassemble and reassemble a brewer during servicing. It would also be advantageous to have a beverage brewer which can be readily accessed by authorized service personnel without the use of tools, but which is not readily disassembled by others. In particular, it would be advantageous to have a brewer in which the internal parts and subassemblies of the brewer structure are interlocked and secured by means of a key lock.

Therefore, it is an object of the present invention to provide an improved beverage brewer which has component parts that interlock without tools to facilitate assembly and disassembly.

Accordingly, a beverage brewer is provided which includes component parts that interlock without tools to facilitate assembly and disassembly. The brewer comprises a tank for holding beverage preparation fluid, and a body which includes walls for partially enclosing an interior space. Operative parts of the brewer are enclosed within the interior space. A tank support is provided within the interior space of the body for supporting the tank within the interior space. An interlock member is engageable with the tank and the tank support to lock the tank to the body of the brewer. And a removable access panel engages the body to further enclose the interior space and to prevent removal of the interlocked member when the panel is installed on the body. The panel is removable to access the interior space for disassembly of the brewer and to disengage the interlock member, thus permitting separation of the tank from the brewer body.

In its preferred form, the tank is secured to the tank support by relative rotation between the tank and a portion of the body, and the interlock means of the invention includes an outflow conduit for the tank which extends outside the tank and engages portions of the body to prevent rotation between the tank and body to secure the tank to the tank support on the body. The removable panel, when installed on the body, engages the outflow conduit to prevent removal of the outflow conduit. The outflow conduit is detachable from the tank when the panel is removed, permitting removal of the tank from the tank support means. Additional non-tool interlocking parts accessible when the removable panel is removed from the body include support legs attached to the body by means of finger-installed clips, and the power interconnections and plumbing connections of the brewer.

DETAILED DESCRIPTION OF THE PREFERRED EMBODIMENT

Figure 1:
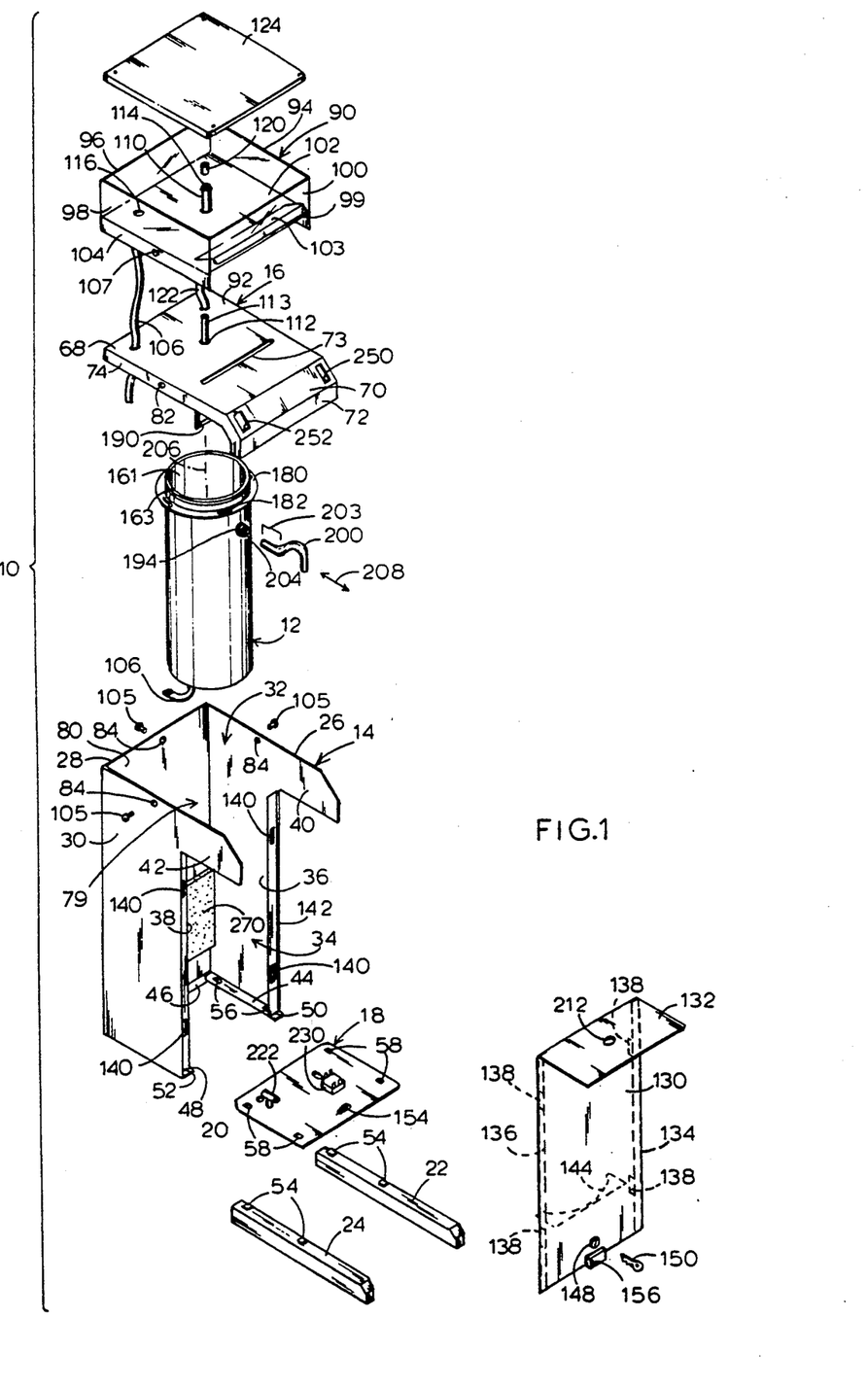
FIG. 1 is a partially exploded, partially schematic, perspective view of the major interlocking components of a beverage brewer with the present invention.

The beverage brewer of the present invention is formed of component parts which interlock without tools to facilitate assembly and disassembly. FIG. 1 shows the principal component parts of the brewer which are intended for non-tool assembly, the component parts being separated from one another in an exploded view. The component parts of brewer 10 include a tank 12 for holding and heating beverage preparation fluid, a body, including a lower, three-sided housing 14 and a top wall 16, the body being designed to surround and partially enclose tank 12 within an interior space within and defined by the body, a bottom plate 18, forming the bottom wall of housing 14 when inserted into a bottom opening 20 at the lower end of housing 14, and a pair of legs 22, 24, which support bottom plate 18 and body 14, 16, as well as the other parts of the brewer 10. Additional component parts of the brewer 10 will be identified and discussed in the description that follows. Some of the component parts of the brewer include subassemblies of operating devices such as the power supply, control circuitry, heating coils for water, temperature sensors and plumbing interconnections. Those component parts are identified in the discussion below as subassemblies which are either pre-assembled by the brewer manufacturer or supplied to the manufacturer in pre-assembled form.

Brewer housing 14 includes three generally flat, generally vertical side walls 26, 28, 30. The side walls form the rear and opposed parallel sides of a generally U-shaped vertical channel Housing 14 and top wall 16 together form part of a body which encloses an interior space 32 within the brewer Interior space 32 is surrounded on three sides and partially defined by walls 26, 28, 30, and is further surrounded and enclosed by top wall 16 and bottom plate 18.

The open side 34 of housing 14, opposite back wall 28, is on the front of body 14, 16. A pair of opposed, co-planar flanges 36, 38 extend toward one another in the open front of housing 14, located just behind the forward edges of side walls 26, 30, respectively. Flanges 36, 38 are generally parallel with rear or back wall 28. The upper portions of side walls 26, 30 include forward extending tabs 40, 42 which cantilever from the front of housing 14. The bottom edges of walls 26, 28, 30 include inwardly-bent base flanges 44, 46, 48 which extend partially into bottom opening 20. Bottom plate 18 is fitted into bottom opening 20 of housing 14 by sliding the plate through gaps 50, 52 just above base flanges 44, 46, 48 and below the bottom of vertical flanges 36, 38.

Figures 2, 3, 4:
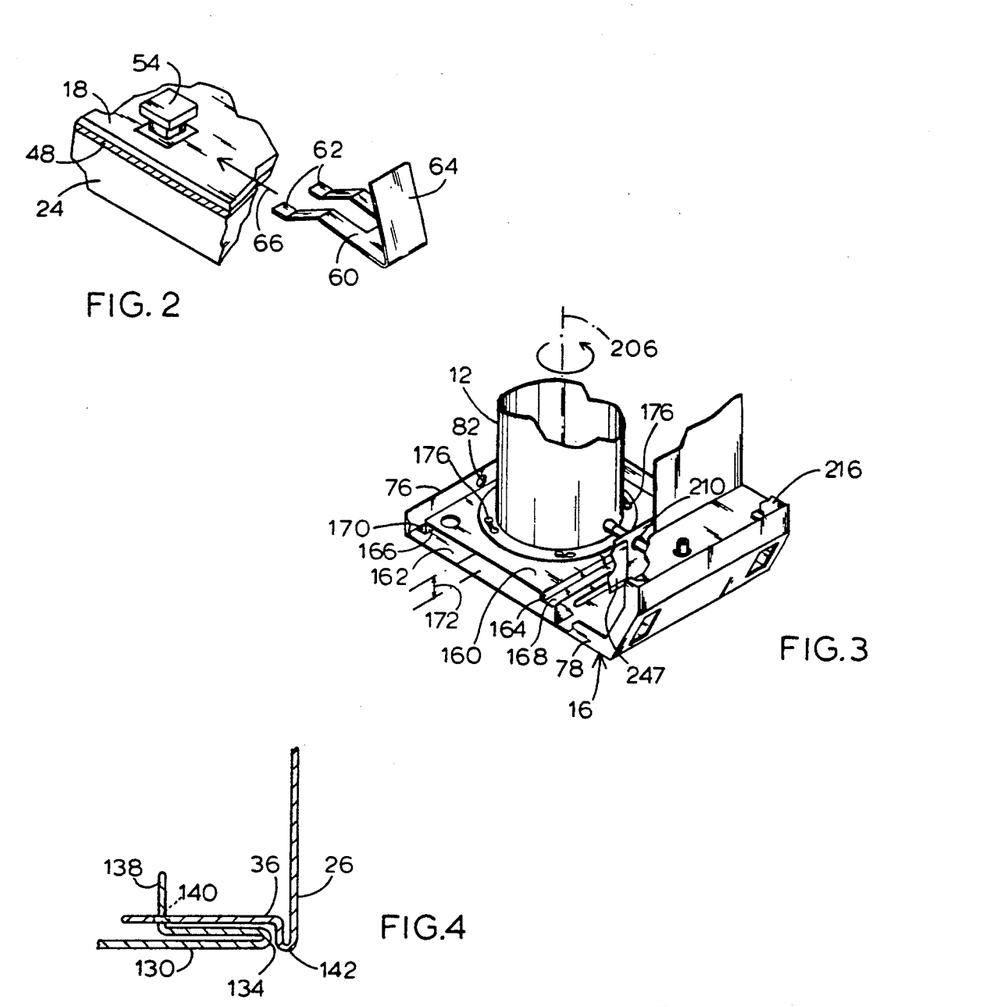
FIG. 2 a partial perspective view, in partial cross-section, showing one of the leg-attaching posts which extends through the brewer housing and the bottom plate, together with a releasable clip for the legs, housing and bottom plate together.
FIG. 3 is a partial perspective view of the top wall of the brewer of FIG. 1, inverted from the orientation in FIG. 1 and partially assembled, the view being partially cut-away to illustrate various elements attached to the top wall.
FIG. 4 a cross-sectional view of a portion of the right forward corner of an assembled brewer as shown in FIG. 9, taken along line 4—4 of FIG. 9, illustrating the interlocking relationship bet side wall of the brewer housing and the removable front panel.
Figures 7, 9:
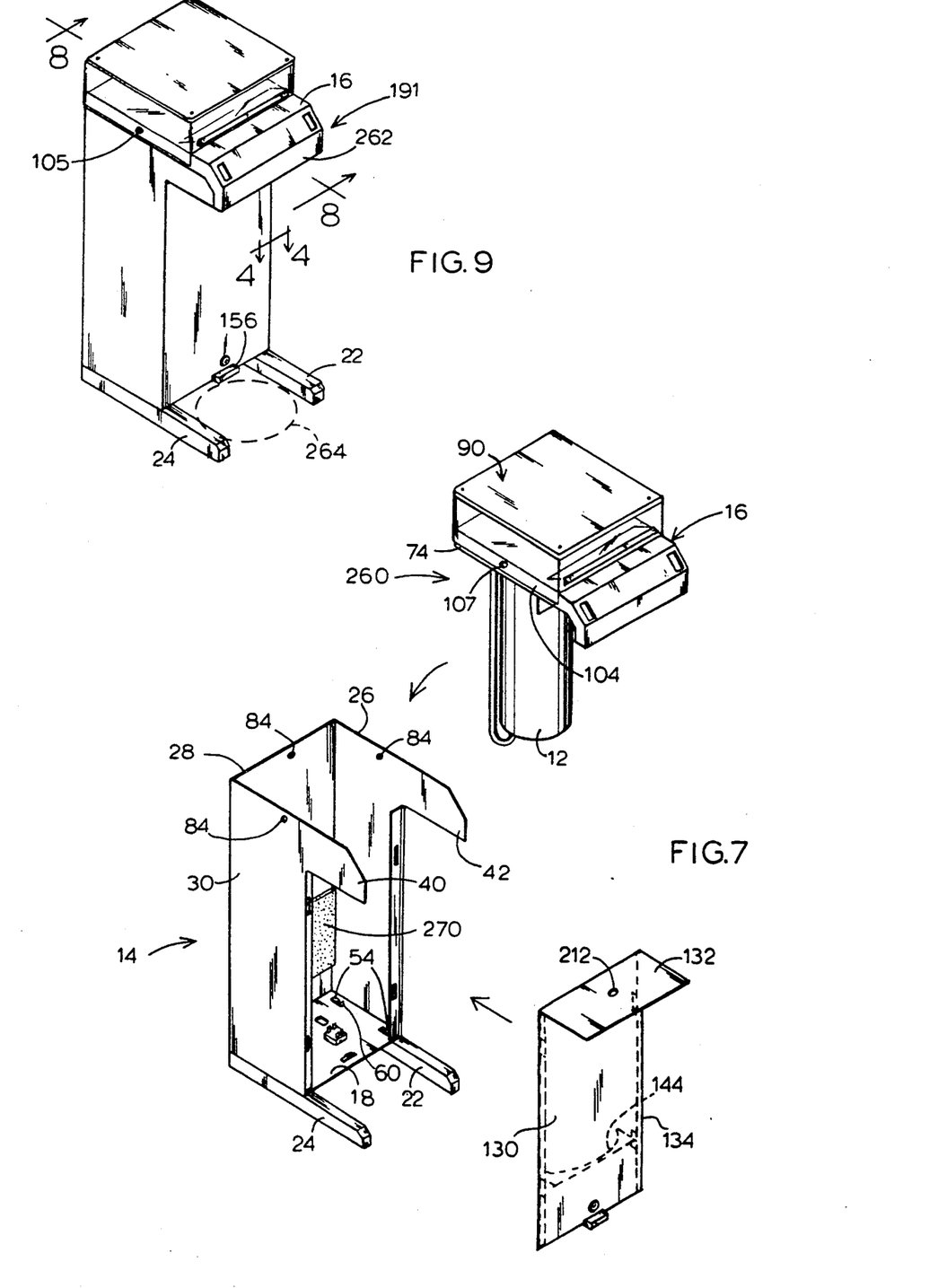
FIG. 7 is a perspective view as in FIG. 1 showing various component parts of the brewer in partially assembled form.
FIG. 9 is a perspective view of the brewer of FIG. 1 when fully assembled.

Legs 22, 24 are elongate, generally rectangular members formed of metal or plastic. Each leg includes a pair of upwardly-extending posts 54, one of which is illustrated in FIG. 2. Each leg post 54 is a short, upright finger or member with a narrow neck and an overhanging ridge or head on top. Although the representative post in FIG. 2 is illustrated as square, posts 54 may alternatively be circular or another shape. To install legs 22, 24 on the bottom of housing 14, posts 54 are inserted through cooperating openings 56 in bottom flanges 44, 48 of housing 14 and corresponding holes 58 in bottom plate 18 The final assembled positions of legs 22, 24, bottom plate 18, and posts 54 is shown in FIG. 7. Bottom plate 18, which is secured to the housing using leg posts 54, is one of the component parts of brewer 10 which has various operative components and devices installed thereon to form a subassembly of the brewer. Bottom plate 18 supports several operative devices, including a solenoid valve and electrical parts described in greater detail below, which are mounted on plate 18 before the final assembly of the brewer.

A plurality of post-engaging clips 60 are used to secure the legs and bottom plate to housing 14. Referring to FIG. 2, each clip 60 includes a pair of generally parallel fingers 62 which are spaced apart from one another a slightly greater distance than the width of the narrow neck, below the top head, of each post 54. Clip 60 is installed on post 54 by sliding the fingers 62 beneath the head of the post, in direction 66, to surround and engage the post. Clips 60 are made of spring steel, plastic or another suitable material and each includes an upturned tab 64 which allows the clip to be grasped for installation and removal. The clips 60 interlock and secure together housing 14, bottom plate 18 and legs 22, 24. Clips 60 and leg posts 54, together with openings 56 in the housing and 58 in the bottom plate, collectively serve as a securing means or securing device for securing the bottom plate and legs to body housing 14. Access to clips 60 is through interior space 34 of housing 14 since the clips on an assembled brewer are located within the brewer housing.

The top 16 of housing 14 is a subassembly of operative devices, including such devices as the main circuit panel, the on/off switch and indicator light for the brewer, and also includes several important structural elements, all of which are discussed below. Top subassembly 16, referred to hereinafter as top wall 16 or the top of the housing, is shown most clearly in FIGS. 1, 3 and 6. Top wall 16 has a generally flat, horizontal major portion 68 and a overhang portion at the front of the brewer with an angled wall portion 70 and downwardly depending forward lip 72. Top wall 16 also includes downwardly-depending perimeter flanges 74, 76, 78 (see FIGS. 1 and 3) extending around the perimeter of its horizontal portion 68 and extending along the side edges of overhang portion 70, 72. Top wall 16 is configured to form the top of housing 14, enclosing the three-sided upper opening 79, which is surrounded by the top edge of walls 26, 28, 30. Perimeter flanges 74, 76, 78 are configured to fit against the outside surfaces of walls 26, 28, 30. An elongated opening 73 through horizontal portion 68 of top wall 16 serves as a vent opening between the enclosed interior of an assembled brewer and the outside of the brewer. Vent opening 7 can be either a single elongated opening (as shown in FIG. 1) or a plurality of smaller openings.

Top wall 16 is attached to housing 14 by means of pins, described below, which fit into cooperating holes 82 formed in flanges 74, 76, 78. Hole 82 in flange 74 is shown in FIG. 1 and hole 82 in flange 76 is shown in FIG. 3. The hole 82 in flange 78 is in the cut-away portion of the flange in FIG. 3. Holes 82 in each of the three flanges 74, 76, 78 are aligned with cooperating holes 84 adjacent the top of walls 26, 28, 30 of housing 14, which are shown in FIG. 1. When top wall 16 is installed on the top of housing 14, holes 82 in flanges 74, 76, 78 will be aligned with holes 84 in housing walls 26, 28, 30 to permit installation of attaching pins through each of the aligned holes 82, 84. Installation of the attaching pins is described below. Additional structural and operating elements of top wall 16, principally on the underside of the top wall, are also described below.

Figures 6, 8:
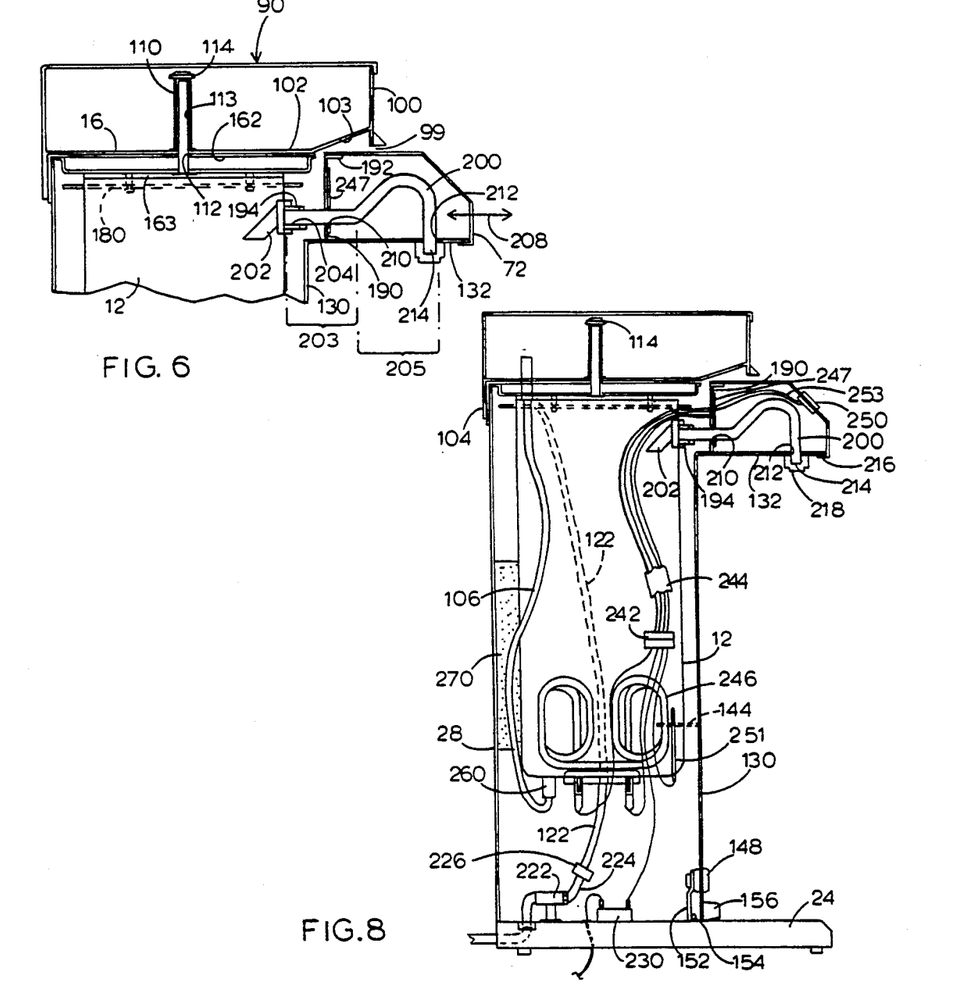
FIG. 6 is a partial cross-sectional view of the top of an assembled brewer, as in FIG. 8, showing selected details of the structure of the top wall and of an assembled brewer on an enlarged scale.
FIG. 8 is a partial, schematic, side cross-sectional view of an assembled brewer taken along line 8—8 of FIG. 9.

A rectangular reservoir 90 fits onto the upper surface 92 of top wall 16, resting on the generally horizontal, flat major portion 68 of the top wall. Reservoir 90 is designed to collect water or other beverage preparation fluid for transfer into main tank 12 of the brewer. Reservoir 90 is preferably formed of high-grade plastic or metal and includes a water-impervious perimeter wall having four sides 94, 96, 98, 100 secured to or integral with a bottom wall 102. A perimeter, downwardly-depending flange 104 extends below the level of bottom wall 102, adjacent the left and right sides 94, 98 and rear side 96. Pin-receiving openings 107 in flanges 104 are aligned with openings 82 in top wall flanges 74, 76, 80, and with openings 84 in housing walls 26, 28, 30. Openings 107 are used to secure the reservoir to body 14, 16, as described below. Bottom side 102 of reservoir 90 includes a forward, upwardly-angled portion 103 (see FIG. 6) which slants upwardly and joins front side 100 above where bottom side 102 joins sides 94, 96, 98. The slanted portion 103 is used to direct air vented through vent opening 73 in top wall 16 to the outside of the brewer. A vent opening 99 extends through front wall 100 to accommodate vented air which travels upwardly through top wall opening 73 and along slanted portion 103. Vent opening 99 preferably includes a short hood or louver, as shown in FIGS. 6 and 8.

Reservoir 90 is sized to overlie the top surface 92 of horizontal top portion 68. Downwardly-depending flanges 104 are spaced slightly outwardly from the left side, right side and rear perimeters of top wall 16, so that flanges 104 overhang and extend outside and adjacent perimeter flanges 74, 76, 78 of the top wall. Openings 107 are designed to receive frictional, hole-engaging pins or similar frictional devices of any suitable type, which are used to attach reservoir 90 to top wall 16 and to attach top wall 16 to housing 14. Three such pins 105 are shown in FIG. 1. Pins 105 are designed to extend through and engage, either by friction, detentes or the like, openings 107 in the downward-depending overhangs 104 of reservoir 90, openings 82 in the depending flanges 74, 76, 78 of top wall 16, and openings 84 adjacent the top of side walls 26, 28, 30. When pins 105 are installed in aligned openings (107, 82, 84), reservoir 90, top wall 16 and housing 14 are joined to one another. When the top wall 16 is in place on housing 14, it further encloses interior space 32 within the brewer.

Several openings are formed in the bottom side 102 of reservoir 90. Centrally disposed in bottom side 102 is an upstanding air vent sleeve 110, in the form of a short piece of plastic pipe or the like sealingly attached to bottom wall 102. Sleeve 110 extends above an opening formed in the bottom side 102 of reservoir 90. Vent sleeve 110 is designed to fit over an upstanding vent tube 113 which extends upwardly through an opening 112 in horizontal portion 68 of top wall 16. Vent tube 113 extends upwardly from tank 12, communicating with the interior of the tank to vent the tank when the brewer is assembled. When reservoir 90 is installed on top wall 16 of the brewer body, vent sleeve 110 is fitted over vent tube 113, allowing the vent tube to extend through the center of reservoir 90 without affecting the fluid-holding integrity of the reservoir. A vent cap 114 is positioned on top of vent sleeve 110, within reservoir 90. Vent cap 114 covers but does not close the vent tube, preventing material from inadvertently falling into the tank of the brewer while providing a suitable tank vent.

Another opening in bottom wall 102 of reservoir 90 is drain hole 116. It is connected to a tank-filling conduit 106 in the form of a hose or pipe which communicates with tank 12 (see FIG. 8). The connection between drain hole 116 and conduit 106 (not shown) can be of any conventional type, such as a suitable hose-clamp or the like. A third opening through bottom wall 102 is fill opening 120, which communicates with a fill conduit 122 connected to an external water supply, as described below. Fill opening 120 is optional, being used only in automatic-fill versions of the brewer which are connected to external plumbing for filling reservoir 90. In a "pour-over" embodiment of the brewer, in which the user is required to fill reservoir 90 manually by pouring liquid into the reservoir, fill opening 120 is omitted.

The top side 124 of reservoir 90 is preferably a detachable, generally flat piece of plastic or the like which is releasably joined to side walls 94, 96, 98 and 100 to close the reservoir. In pour-over versions of the brewer, top side 124 serves as a removable cover. Finger-engaging indentations or projections (not shown) may be provided on cover 124 to facilitate removal, if desired. In the automatic-fill version of the brewer, top cover 124 will generally be secured permanently to reservoir 90.

Completion of the enclosure of interior space 32, within body 14, 16, requires closure of the elongate, vertical front opening 34 between left and right side walls 26, 30. For this purpose, a removable access panel 130 forms the forward side wall of housing 14. Panel 130 is a generally flat, vertical panel with a horizontal, overhanging piece 132 extending horizontally over the front vertical side of the panel. Along the left and right side edges 134, 136 of panel 130 are rearwardly-extending tabs 138 for engaging cooperating slots 140 formed in front edge flanges 36, 38 of housing 14.

FIG. 4 is a detailed cross-sectional view, taken along line 4-4 of FIG. 9, on an enlarged scale, showing the right side edge of panel 130 and a portion of right side wall 26 of housing 14, with tab 138 extending through and engaging a slot 140. Edge 134 of panel 130 is folded over for safety and aesthetics. Tab 138 is inset inwardly from the longitudinal side edge 134 of panel 130 and extends perpendicularly rearwardly from the flat front of the panel. Forward edge 142 of the right side wall 26 of housing 14 similarly includes a folded edge. The slots 140 in inwardly extending flange 36 engage and surround tabs 138 of panel 130. Flange 36 extends perpendicularly from side wall 26 a short distance back from the forward edge 142 of wall 26. When front panel 130 is installed on the front of housing 14, tabs 138 extend through openings 140, as shown in FIG. 4, and the folded side edge 134 of the panel and folded forward edge 142 of the housing become flush with one another to provide a clean, tight-fitting corner. In the preferred embodiment, four tabs 138 are formed on the interior side of removable panel 130 and engage four slots 140 on housing 14. A greater or lesser number of tabs and tab-engaging slots may be provided, as desired. Left side edge 136 of panel 130 and the forward edge of left side wall 30 of housing 14 appear exactly as does a mirror image of the right side edge 134 and right forward edge 142 of wall 26 depicted in FIG. 4.

The inside surface of front panel 130 includes a crescent-shaped tank-engaging saddle-piece 144 which extends horizontally into interior space 32 of the housing to engage the side of tank 12. Saddle-piece 144 helps stabilize the tank and also helps hold the tank in its proper position within the housing. At the bottom of front panel 130 is a key lock 148 for receiving a key 150. On the interior side of lock 148 is a rotational locking tab 152 (see FIG. 8) which can be rotated by the lock mechanism 148 into engagement with an upstanding tang 154 on basic plate 18. A rubber bumper 156 is attached to the exterior side of plate 130 at or near the bottom of the plate to serve as a bumper against which an airpot or other beverage dispenser rests when being filled.

Tank 12 is supported on the interior of the brewer body 14, 16, by a tank support system on the underside of top wall 16, which is shown most clearly in FIGS. 1, 3 and 6. FIG. 3 shows top wall 16 inverted from the orientation of FIGS. 1 and 6, primarily because it is in the inverted orientation of FIG. 3 that tank 12 will be installed on top wall 16 during brewer assembly. On the underside of top wall 16 (uppermost in FIG. 3) is the tank support system of the brewer, which means that tank 12 is designed to hang downwardly from top wall 16. A tank support plate 160 is attached to the inside surface 162 of top wall 16, on the underside of major horizontal portion 68. Mounting plate 160 is a generally flat, rectangular metal plate which is attached to the underside 162 of top wall 16 by perpendicular side edges 164, 166 which extend along two sides of the plate. Outwardly-extending flanges 168, 170 extend from walls 164, 166, respectively, and fit flush against the underside of top wall 16. Suitable welds, rivets or the like (not shown) are used to attach mounting plate 160 to the underside 162 of top wall 16, along flanges 168, 170. Plate 160 is spaced from and parallel to top wall 16. The gap between the mounting plate 160 and top wall 16 is indicated by arrows 172 and is preferably approximately ¼-inch The gap provides an air space which insulates the flat, horizontal expanse 68 of top wall 16 from the heat of tank 12.

Tank 12 has an open top side 161 which is designed to fit tightly against mounting plate 160, to close the tank once the tank is mounted against the plate. A suitable seal 163 on the top of tank 12, extending around the perimeter of open top 161, provides for sealing engagement between the top of tank 12 and flat mounting plate 160. Seal 163 may be made of soft, food-grade silicone rubber or the like. Vent tube 113 is sealingly attached to mounting plate 160 (see FIG. 6), and extends upwardly through an opening 112 in top wall 16, as described above. In a fully-assembled brewer 10, mounting plate 160 forms the top cover of tank 12 and vent tube 113 communicates directly with the interior of tank 12. Vent sleeve 110 slides over vent tube 113 when reservoir 90 is installed on top wall 16.

Figure 5:
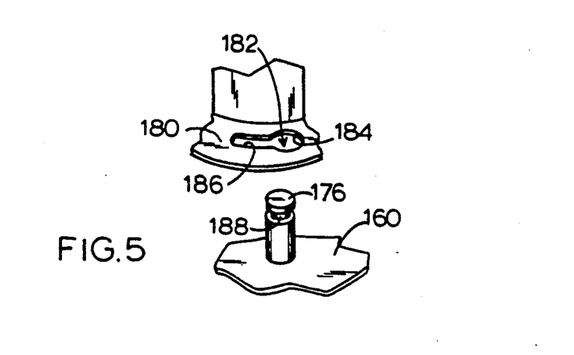
FIG. 5 is a partial perspective view on an enlarged scale of one of the support posts for the main tank of the brewer, together support post-engaging flange on the tank for supporting from the top wall as shown in FIG. 3.

The system for attaching and supporting the tank from mounting plate 160, within the interior of housing 14, 16, includes a plurality of mounting posts 176 attached to mounted plate 160. One of the mounting posts 176 is shown on an enlarged scale in FIG. 5, and the posts are also shown in FIGS. 3 and 6. To attach the tank to mounting posts 176, tank 12 is provided with a radially-outwardly-extending flange 180 near the top end of the tank. Flange 180 is affixed to tank 12 in a predetermined rotational orientation and is not free to rotate with respect to tank 12. A plurality of slotted, keyhole openings 182 are formed in radial flange 180 (one of which is shown in FIG. 5) for engaging posts 176. Slot 182 is enlarged at one end 184 and has a narrower portion at 186. Narrow portion 186 engages the narrower neck portion 188 of post 176 when the post is inserted in enlarged portion 184 and slid along the slot. In the preferred embodiment, four openings 182 are formed in flange 180. Since flange 180 on tank 12 is circular, the elongated narrow portion 186 of each slot 182 is curved, with the sides generally concentric with the curvature of flange 180.

Installation of tank 12 on posts 176 is accomplished by aligning each of the enlarged portions 184 of slots 182 with one of the posts 176, inserting each post into its respective slot, and rotating the tank relative to top wall 16, in the direction of the circular arrow shown in FIG. 3, to engage the neck portion 188 of each post within narrow portion 186 of each slot 182. The length of each pin-engaging slot 182 determines the amount of relative rotation permitted between tank 12 and top 16. Once the posts 176 have been engaged within slots 182, and tank 12 is rotated as required, the tank is engaged on and attached to top 16. The posts and slotted flange serve to support the tank within the brewer housing 14 from top wall 16. As such, the posts 176 and flange 180 serve as tank support means for supporting the tank from top wall 16 within the interior space 32 of body 14, 16.

Additional parts and features of the underside of top wall 16 are shown in FIGS. 3, 6 and 8. A downward-extending, transverse, substantially vertical partition wall 190 is attached to top wall 16, on the interior side of the top wall, forward of horizontal mounting plate 160 and forward of vent opening 73. The partition extends across most of the width of top wall 16, spaced slightly from side flanges 74 and 78 at each end to admit the side walls 26, 30 between the partition and flanges 74, 78 when top 16 is installed on housing 14. Partition 190 is mounted perpendicularly to the horizontal major portion 68 of top wall 16 and is attached to the underside 162 of the top wall by a suitable angle flange 192 (see FIG. 6). One function of partition wall 190 is to separate the forward overhang portion of an assembled brewer, enclosed by side tabs 40, 42 of housing 14, from the rest of the interior space within housing 14, 16. The forward overhang portion 191, of an assembled brewer (see FIG. 9), houses electrical control circuitry, switches and other devices used to operate the brewer. Partition 190 helps isolate that control circuitry from the remainder of the brewer. A printed circuit board or the like, which may include such circuit elements as a microprocessor or timing devices, can be conveniently mounted on partition 190. The partition 190 also serves as the portion of top wall 16 that interlocks with an interlocking spout member which extends between the tank and top wall 16, as described below.

A syphon spout socket 194 is provided on the side wall of tank 12 (see FIGS. 1, 6 and 8). Socket 194 includes a sealable opening into which a removable syphon tube or spout 200 is fitted to provide an outflow conduit for the tank. Socket 194 includes an intake tube 202 on the interior of tank 12, which projects inwardly at a downward angle from the vertical side wall of the tank. On the outside of tank 12, socket 194 includes an opening 204 which communicates with intake tube 202 through the wall of the tank. Socket 194 can conveniently be formed as two threaded parts engageable with one another through a hole in the wall of tank 12 which are pre-assembled on the tank prior to final assembly of the brewer. Once socket 194 is installed in the wall of the tank, it becomes a spout-receiving fitting or socket 194 having an exterior opening 204 into which a removable syphon tube can be sealingly fitted.

Syphon tube 200 is a short piece of pipe or tubing shaped or bent to have a relatively straight shank portion 203 and hook-shaped end portion 205. Shank portion 203 of syphon tube 200 fits into opening 204 of socket 194, which is slightly larger in diameter than the outside diameter of the syphon tube. An O-ring or other suitable sealing device (not shown) is preferably installed within opening 204 of fitting 194 to sealingly engage the shank of the syphon tube in a fluid-tight manner. In that way, the syphon tube 200 can be installed and removed from fitting 194 by straight movement in and out, in the directions indicated by arrows 208 in FIGS. 1 and 6. In an assembled brewer, syphon tube 200 extends through an opening 210 in partition 190, and the hook-shaped end portion 205 extends downwardly through and below the bottom of overhang portion 191 of the brewer.

Syphon tube 200 serves as a means for interlocking the tank 12 to the housing of the brewer. After tank 12 has been installed on support posts 176, as described above, syphon tube 200 is slid through opening 210 in top wall partition 190 and into opening 204 of fitting 194. After the spout is installed in socket 194, tank 12 cannot be rotated with respect to top wall 16 because the spout extends through opening 210 of partition 190 which fixes the rotational orientation of the tank with respect to top wall 16. Since tank 12 can only be disengaged from support posts 176 by rotating the tank with respect to top wall 16, the tank cannot be removed as long as spout 200 is inserted in fitting 194. In other words, spout 200 acts to interlock the tank into a predetermined rotational orientation with respect to top wall 16. As such, installation of spout 200 in fitting opening 204 fixes the tank to the tank support posts 176 and prevents disengagement.

The sequence for installing tank 12 in an interlocked relationship with top wall 16 is as follows: Insert pins 176 into the large ends 184 of key-hole slots 182; rotate tank 12 relative to top wall 16 to engage the narrow neck 188 of each post 176 within the narrow end 186 of each slot 182, continuing such rotation until fitting 194 is aligned with opening 210 in partition 190, and; insert syphon tube 200 through opening 210 in partition 190 and into fitting 194. Once tank 12 is installed on top wall 16 in the manner described, the tank becomes interlocked with the tank support means of top wall 16 and cannot be rotated out of engagement with support posts 176 until interlocking spout 200 is removed from fitting 194.

In a fully assembled brewer 10, the outer hook-shaped portion 205 of syphon tube 200 extends downwardly below the overhang portion 191 of the brewer (see FIGS. 6, 8 and 9). When removable front panel 130 is installed on the front of brewer 10, the forward-extending portion 132 of front panel 130 fits underneath overhang portion 191. In the forward overhang portion 132 an opening 212 is provided through which the outlet end 214 of syphon tube 200 extends. The panel thus engages the siphon spout when it is installed, preventing removal of spout 200 unless panel 130 is removed. After panel 130 has been installed on the front of brewer 10, a suitable outlet fitting or spray nozzle 218 can be installed on the outlet end 214 of syphon tube 200, if desired. When panel 130 is installed as shown in FIG. 8, with the end 214 of syphon tube 200 extending through opening 212 in front panel overhang 132, the panel prevents removal of syphon tube 200 from its interlocking relationship with tank 12 until panel 130 is removed. As such, the front panel serves to interlock the syphon tube, tank and top wall together. Thus, when the front panel is in place on an assembled brewer and key lock 148 has been turned to its locked position shown in FIG. 8, the interior of the brewer is inaccessible (without key 150) and the various component parts of the brewer are interlocked together.

FIG. 8 illustrates several additional internal parts of brewer 10 which include the water hoses or conduits interconnecting tank 12 with reservoir 90, electrical connections for energizing the heating coils and for powering the control system of the brewer, and a solenoid valve for filling the brewer from external plumbing. Beginning with the parts attached to bottom plate 18, with reference to FIGS. 8 and 8A, an exterior plumbing conduit 220 communicates with a solenoid valve 222 mounted on bottom plate 18. Valve 222, which is represented schematically in FIG. 8, opens to admit water into the brewer, and closes to terminate the inflow. From valve 222, water travels through conduit 224 to a flow metering device 226 and then into conduit 122, where it is carried to the inflow port 120 in reservoir 90 (see FIG. 1). A suitable plumbing interconnection 225 connects conduit 224 to valve 222. An external plumbing connection 228 is used to couple inlet conduit 220 to valve 222. Connections 225 and 228 can be any suitable well-known type of connection, such as threaded or snap-on connectors. Flow meter 226 in line 224/122 is used by the brewer control circuitry to measure the flow of water to tank 12. A quick-disconnect connector (not shown) is preferably provided between flow meter 226 and conduit 122 for convenient separation of the conduit from the measuring device 226 to facilitate assembly and disassembly. Above-described solenoid valve 222, and the external and internal plumbing connections to the solenoid valve, are omitted in "pour-over" versions of the brewer, which are not connected to an external plumbing line.

Figure 8A:
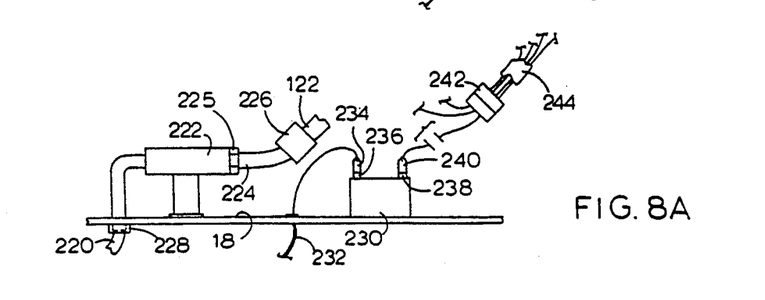
FIG. 8A is a partial, schematic, detail view of a portion of the bottom plate of the brewer, as shown in FIG. 8, on an enlarged scale elements removed for clarity.

Electric power connections between brewer 10 and an outside power source are made through a power block 230 mounted on bottom plate 18. Power block 230 receives power through an external power cord 232, which carries power to a pair of slide-on leads 234, a representative one of which is visible in FIGS. 8 and 8A. Assuming that power cord leads 234 are female, power block 230 includes cooperating male connector tabs 236. The power block distributes electrical power to one or more pairs of male output leads 238, one of which is shown in FIGS. 8 and 8A. Female power distribution leads 240, one of which is shown in FIGS. 8 and 8A, communicate with a wiring connector 242 on an electrical distribution line bundle 244. Line 244 is a schematic representation of all the various electrical conductors interconnected by connector 242.

At the upper end of brewer 10, the control circuitry for the brewer (not shown) is mounted against partition 190, of top wall 16 as indicated schematically at 247 in FIGS. 3, 6 and 8. The control circuitry is preferably included on a printed circuit board 247 or similar pre-wired circuit means. An on-off switch 250 and indicator light 252 are provided on the angled surface 70 of top wall 16 and are connected by wires 253 to circuit board 247. All other connections between the control circuitry of circuit board 247 on partition 190, and other parts of the brewer, are carried in wire bundle 244, which passes through connector 242. Included in bundle 244 are wires supplying or distributing power to the heating coils 246 in tank 12, wires carrying power from power block 230 to circuit board 247, and sensor wires communicating with tank thermostat sensor 251. Connector 242 thus acts as a quick-disconnect means between the electrical circuitry extending between the upper half and lower half of the brewer, allowing interconnection of devices attached to top wall 16, and devices mounted on bottom panel 18 and within tank 12.

An important feature of the brewer of the present invention is that various of the component parts of the brewer interlock simply and quickly without tools and are easily disassembled for servicing and repair. In particular, tank 12 is designed to attach quickly to housing 14, 16, and the housing is designed to interconnect with base plate 18 and legs 22, 24, by means of clips 60. Front access panel 130 is configured to engage body 14, 16 to completely enclose interior space 32 and also interlocks or prevents disassembly of various of the component parts by anyone who does not have possession of key 150. A brief explanation of the assembly of brewer 10 in accordance with the present invention will be provided with reference to FIGS. 1, 2, 3, 4, 5, 6, 7, 8 and 8A. The separate component parts which can be assembled without tools include the following: Housing 14, top wall 16, reservoir 90, bottom plate 18, legs 22, 24, tank 12, spout 200, and front wall panel 130. Assuming, at the start, that those component parts are separated from one another, the assembly sequence of brewer 10 is as follows:

(1) Attach tank 12 to top wall 16. This step is preferably accomplished by inverting top wall 16 as shown in FIG. 3, aligning key hole openings 182 with posts 176 and rotating tank 12 relative to top wall 16 as described above. The seal 163 on the top opening of tank 12 engages against mounting plate 160 on top wall 16 to close the tank.

(2) Insert interlock spout member into tank 12. The spout 200 is inserted through opening 210 in top wall partition 190 and into fitting 194. That interlocks the spout, tank and top wall, preventing the tank from turning relative to the top wall or from disengaging from posts 176.

(3) Install reservoir 90 on top wall 16 with the downwardly-depending partial perimeter flange 104 positioned alongside flanges 74, 76, 78. Hoses 106, 122 may have to be connected to reservoir 90. Completion of the installation of reservoir 90 on top wall 16 and of top wall 16 on housing 14 is accomplished in the next step (Step 4) by inserting pins 105 into cooperating openings 104 in reservoir 90, openings 82 in top wall 16 and openings 84 in housing 14. This step (Step 3) may be performed before installing tank 12 on top wall 16 (Step 1).

(4) Invert the top wall, tank and reservoir to the position shown at 260 in FIG. 7 and set the entire top assembly on the top edge of housing 14, along side walls 26, 28, 30. The downwardly depending flanges 74, 76, 80 of top wall 16 are positioned outside the perimeter of housing 14 along the top edge of the side walls. Some manipulation or flexing of forward tabs 40, 42 may be necessary to clear rearwardly extending front flange 216. The two halves of connector 242 are interconnected and hose 106 is attached to tank 12. Hoses 106 and 122 and electrical wires 244 may need to be arranged for proper positioning within the interior space 32 of housing 14.

(5) Insert pins 105 in openings 107 through flanges 104 of reservoir 90, through openings 82 in flanges 74, 76, 80 in top wall 16 and through openings 84 in side walls 26, 28, 30 to complete assembly of body 14, 16 and attachment of reservoir 90.

(6) Slide bottom plate subassembly 18 into place adjacent lower flanges 44, 46, 48 of housing 14.

(7) Position legs 22, 24 beneath housing 14 and bottom plate 18, with posts 54 extending through aligned openings 56 on housing flanges 44, 48 and openings 58 on plate 18.

(8) Install clips 60 on posts 54, interlocking the legs and bottom plate to housing 14. Electrical connections to power block 230 and the plumbing connection between conduit 122 and flow meter 226 (FIG. 8A) are made at this time. If sleeve connectors 234 are disconnected from power block 230, they are connected. If the two halves of connector 244 remain separated, they are interconnected.

It should be noted that steps (6), (7) and (8) could be performed prior to steps (1), (2), (3), (4) and (5), if desired.

(9) Finally, removable access panel 130 is installed over open side 34 of housing 14, as shown in FIG. 7. Installation is effected by inserting horizontal panel 132 over the lower lip 216 of top wall 16, aligning opening 212 with spout 200 so the spout extends through opening 212 and fitting tabs 138 into cooperating slots 140 on housing 14. Nozzle 218 is then installed on spout 200. Key 150 is turned in lock 148, engaging tang 154 on bottom plate 18, and the key is removed.

Disassembly of the brewer is accomplished by reversing the above-described assembly steps. Once the brewer is assembled, it can operate as any normal hot beverage brewer. In an automatic-fill brewer, when the on-off switch 250 is switched on, a heating cycle is initiated in tank 12. Water is heated to the appropriate temperature for the beverage. Referring to FIG. 8, the space between legs 22, 24 is where a dispenser such as an airpot is positioned, beneath spout 200, which emerges from the brewer beneath the overhang 191 of top wall 16. The airpot is preferably positioned approximately at location 264, resting against bumper 156. Hot water is caused to emerge from spout 200 into the airpot by admitting water into reservoir 90 via conduit 122. The reservoir then drains via line 106 to the tank inlet fitting 260 (FIG. 8) on the bottom of the tank, where the water passes upwardly through the tank coils 246. Spout 200, together with spout inlet 202 and fitting 194, acts as a syphon, and water emerges from the outlet end 214 of spout 200 into a brewing device such as a coffee-filled funnel or basket positioned immediately below spout outlet 214.

Tank 12 is separated from all external walls of the brewer by air spaces, which prevents overheating of the exterior surfaces of the brewer. Since tank 12 hangs downwardly from top wall 16 into the interior space 32 of housing 14, the tank does not touch the side walls 26, 28, 30 or front panel 130 of the housing. On top wall 16, tank 12 is fitted tightly against mounting plate 160, which serves as the top wall of tank 12. Air space 172 (FIG. 3) separates tank 12 from top wall 16. Venting of the interior of the brewer body 14, 16 is through opening 73, which communicates with the outside air through angled channel 103 beneath reservoir 90. Crescent-shaped tank-engaging piece 144 on panel 130 pushes against tank 12, which is engaged on the back side by an insulating pad 272 mounted on the inside of back wall 28 (see FIGS. 1 and 8). In that way, tank 12 is fixed firmly in place within interior space 32. Should anyone attempt to disassemble the brewer without a key 150 by removing pins 105 and lifting top wall 16, the tight engagement of tank 12 by crescent-shaped piece 144 and pad 272 will retain the tank and the attached top wall on the brewer.

The beverage brewer of the present invention can be assembled from its component parts, without tools, in less than five minutes. An experienced assembler working on an appropriately-designed assembly line should be able to assembly an entire brewer from the component parts in FIG. 1 in less than two minutes. Disassembly of the brewer into its component parts can be accomplished, without tools, in less than five minutes and preferably in less than two minutes. These assembly and disassembly times represent a small fraction of the time required to assemble and disassemble prior art beverage brewers of the type suitable for filling airpot beverage dispensers. As such, the brewer of the present invention offers a considerable time savings for both assembly personnel and service personnel. In addition, unlike conventional prior art brewers, access to the interior of the brewer is by means of a key lock which more readily prevents unauthorized access than prior art brewers, which generally require only a screwdriver or the like to gain access for disassembly. With the present invention, an authorized service person with a key will be able to quickly access the interior of the unit and disassemble the parts requiring repair or replacement. On the other hand, without a key, an unauthorized person will be prevented from easy access to the interior of the brewer without destroying or damaging the unit. Even the bottom legs and bottom plate cannot be removed unless panel 130 is first detached from the unit to give access to bottom-securing clips 60. Thus, the unit is designed to be easily assembled and disassembled, without tools, by persons authorized to do so, and to inhibit and discourage unauthorized disassembly by others.

The preferred embodiment of the beverage brewer of the present invention is intended to have side walls and top and bottom walls formed of sheet metal fabricated to provide the shapes indicated in the description above. In particular, housing 14, top wall 16 and the parts of the top wall which interlock with tank 12, such as mounting plate 160, partition 190 and mounting posts 176, as well as bottom wall 18, are preferably formed of stainless steel or another suitable metal. Removable front panel 130 is also preferably formed of stainless steel. Other materials may also be used for the exterior walls in some applications.

The system disclosed for supplying beverage preparation liquid to tank 12 is particularly advantageous for use in commercial-grade beverage brewers. As described above, the system for supplying water to tank 12, in the automatic-fill-type version of the brewer, includes a solenoid valve 222 on bottom plate 18, a hose or conduit 122 for transferring the fluid to upper reservoir 90, and a upper reservoir drain conduit 106 for transferring the liquid to the tank below. That system of conduits, and use of upper reservoir 90, provides a "vacuum break" fill system which prevents any liquid in tank 12 from being drawn out through external line 220, in the event a strong vacuum should form in the external line or the plumbing to which it is connected. Tank 12 is therefore isolated from the external plumbing line by this "vacuum break" system, which is required in many city codes.

Alternative embodiments are possible within the scope of the present invention. For example, the tank support system which employs a plurality of support posts 176 and slotted key-hole openings in the circumferential flange 180 surrounding tank 12, could alternatively be provided by an internally-threaded collar attached to mounting plate 160, together with cooperating external threads on the upper outside wall of tank 12. In such a system, tank 12 would be screwed into the internally-threaded collar by relative rotation between the tank and top wall 16. Once the tank is screwed far enough into the mounting collar, and spout-receiving fitting 194 is rotated into alignment with opening 210 in top wall partition 190, the removable syphon spout 200 can be installed in the same manner as the embodiment described in detail above. The metal suggested for the body of the preferred embodiment of brewer 10 could, is some applications, be other than stainless steel. Similarly, reservoir 90 could be formed of either metal or plastic. Although use of a key lock is suggested for front panel 130, alternative panel-securing means could be employed, such as a screw-type fitting requiring a single tool to open, in place of the key. Alternative internal plumbing and electrical connections may be employed with the modular brewer system of the present invention.

The invention provides a beverage brewer which can be quickly assembled and disassembled, without tools, thereby substantially reducing the time spent by service personnel in accessing the interior of the brewer for service or part replacement. The invention provides a beverage brewer in which the internal parts and portions of the brewer which must be accessed for disassembly are readily accessible to authorized personnel but are generally inaccessible to others.

While the present invention has been shown and described with reference to the foregoing preferred embodiment, it should be apparent to those skilled in the art that other changes in form and detail may be made without departing from the scope or spirit of the invention as defined in the appended claims.

What is claimed is:

1. A beverage brewer having component parts which interlock without tools to facilitate assembly and disassembly, the brewer comprising:
   a tank for holding beverage preparation fluid,
   a body including walls for partially enclosing an interior space in which operative parts of the brewer are enclosed, and including a tank support for supporting said tank within the interior space,
   an interlock member engageable with said tank and said tank support for locking said tank to said body, said interlock member including an outflow conduit for said tank which when coupled to said tank extends outside said tank and engages portions of said body to secure said tank to said tank support, and
   a removable access panel which engages said body to further enclose the interior space and which also engages said interlock member including the outflow conduit to prevent removal of the interlock member when said panel is installed on said body, thereby interlocking said tank to said body, said panel being removable to access the interior space for disassembly of the brewer and to disengage said interlock member permitting separation of said tank from said body.

2. A beverage brewer as in claim 1 in which said outflow conduit is detachable from the tank to permit removal of said tank from said tank support means on said body.

3. A beverage brewer as in claim 2 in which said tank is engageable with said tank support means by relative rotation between said tank and said body, said outflow conduit engaging portions of said body when attached to said tank to prevent relative rotation between said tank and said body, whereby disengagement of said tank from said body is prevented.

4. A beverage brewer as in claim 3 in which said removable access panel includes an outflow opening through which said outflow conduit extends when said panel is installed on said body, the portion of said panel surrounding said outflow opening engaging said outflow conduit to prevent detachment thereof from said tank when said panel is installed on said body, thereby preventing removal of said tank from said support means.

5. A beverage brewer as in claim 1 in which said body includes a top wall for further enclosing the interior space, said tank support being attached to said top wall for supporting said tank from said top wall.

6. A beverage brewer as in claim 1 including a detachable bottom wall for said body to further enclose the interior space, and securing means for said bottom wall for securing said bottom wall to said body, said securing means being accessible from the interior space and being inaccessible when said access panel is installed on said body, whereby said bottom wall is secured to said body when said panel is installed on said body.

7. A beverage brewer as in claim 6 including legs for the brewer, said securing means for said bottom wall additionally securing said legs to said body, whereby said bottom wall and said legs are secured to said body when said panel is installed on said body.

8. A beverage brewer as in claim 1 in which said removable access panel is engageable with said body by means of a key lock, whereby installation and removal of said access panel is accomplished by use of said key lock.

9. A beverage brewer having component parts which interlock without tools to facilitate assembly and disassembly, the brewer comprising:
   a tank for holding beverage preparation fluid,
   a body including walls partially enclosing an interior space in which operative parts of the brewer are enclosed, including a top wall having a tank support attached thereto for supporting said tank from said top wall within said interior space, said tank being engageable with said tank support by relative rotation between said tank and said body,
   an interlock member engageable with said tank and said tank support for locking said tank to said body, said interlock member engaging a portion of said top wall to prevent relative rotation between said tank and said top wall to lock said tank to said body, and
   a removable access panel which engages said body to further enclose the interior space and which prevents removal of said interlock member from engagement with said portion of said top wall when said panel is installed on said body, said panel being removable to access the interior space for disassembly of the brewer and to disengage said interlock member from said tank and said top wall to permit separation of said tank from said body.

10. A beverage brewer as in claim 9 in which said interlock means includes a detachable outflow conduit for said tank which when coupled to said tank extends outside said tank and engages portions of said top wall to secure said tank to said tank support means, and wherein said panel when installed on said body prevents disengagement of said outflow conduit from said tank to interlock said tank to said body.

11. A beverage brewer as in claim 9 including a detachable bottom wall for said body to further enclose the interior space, and securing means for said bottom wall for securing said bottom wall to said body, said securing means being accessible from the interior space and being inaccessible when said access panel is installed on said body, whereby said bottom wall is secured to said body when said panel is installed on said body.

12. A beverage brewer as in claim 11 including legs for the brewer, said securing means for said bottom wall additionally securing said legs to said body, whereby said bottom wall and said legs are secured to said body when said panel is installed on said body.

13. A beverage brewer as in claim 9 in which said removable access panel is engageable with said body by means of a key lock, whereby installation and removal of said access panel is accomplished by use of said key lock.

* * * * *